United States Patent

Taeuber, Jr. et al.

[11] Patent Number: 5,149,148
[45] Date of Patent: Sep. 22, 1992

[54] PIPE SWIVEL JOINT WITH IMPROVED BORE SEAL

[75] Inventors: Ralph Taeuber, Jr., Houston; Sergio A. Castillo, Jr., Spring; Tep Ungchusri, The Woodlands, all of Tex.

[73] Assignee: FMC Corporation, Chicago, Ill.

[21] Appl. No.: 744,611

[22] Filed: Aug. 13, 1991

[51] Int. Cl.⁵ .............................................. F16L 27/00
[52] U.S. Cl. ..................... 285/276; 285/281; 285/341; 285/379; 277/98
[58] Field of Search ............... 285/276, 281, 341, 379, 285/910; 277/207 A, 198; 384/280, 912, 420, 424, 903

[56] References Cited

U.S. PATENT DOCUMENTS

| | | | |
|---|---|---|---|
| 1,902,697 | 3/1933 | Ellingsen | 285/276 |
| 2,382,375 | 8/1945 | Allen et al. | 285/276 X |
| 2,396,123 | 3/1946 | Phillips | 285/276 X |
| 3,290,068 | 12/1966 | Jackson | 285/281 X |
| 3,363,919 | 1/1968 | Brazell, II | 285/276 |
| 4,358,168 | 11/1982 | Magazian et al. | 384/322 |
| 4,431,217 | 2/1984 | Witt | 285/379 X |
| 4,626,003 | 12/1986 | Williams et al. | 285/276 X |
| 4,653,780 | 3/1987 | Lalikos | 285/276 |
| 4,781,404 | 11/1988 | Tharp et al. | 285/136 X |
| 4,804,206 | 2/1989 | Wood et al. | 285/276 X |
| 4,867,483 | 9/1989 | Witt et al. | 285/353 |
| 4,930,791 | 6/1990 | Ungchusri et al. | 277/198 X |

Primary Examiner—Randolph A. Reese
Assistant Examiner—Heather Chun
Attorney, Agent, or Firm—W. William Ritt, Jr.; Richard B. Megley

[57] ABSTRACT

A pipe swivel joint with male and female hubs and an improved bore seal assembly having an anti-extrusion ring that axially energizes the swivel joint hubs toward their operational position as the joint is assembled.

18 Claims, 2 Drawing Sheets

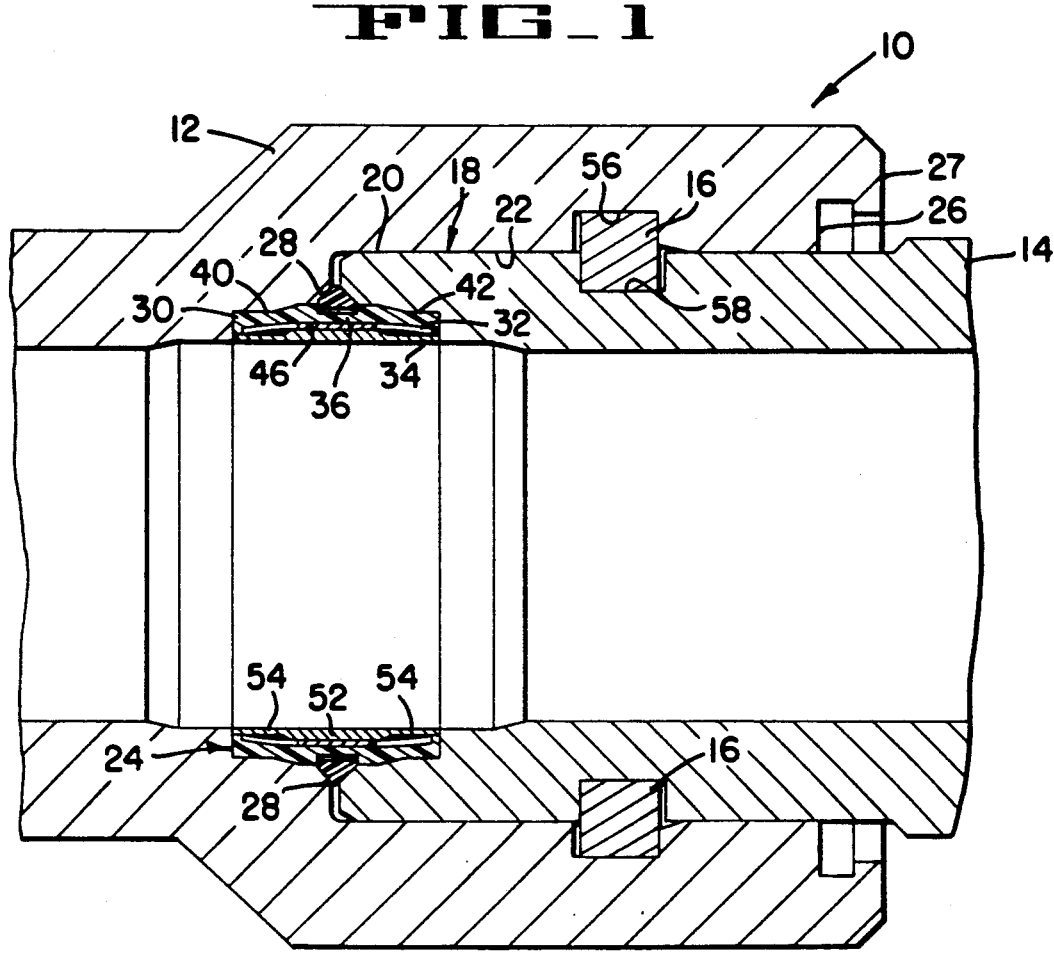
FIG_1
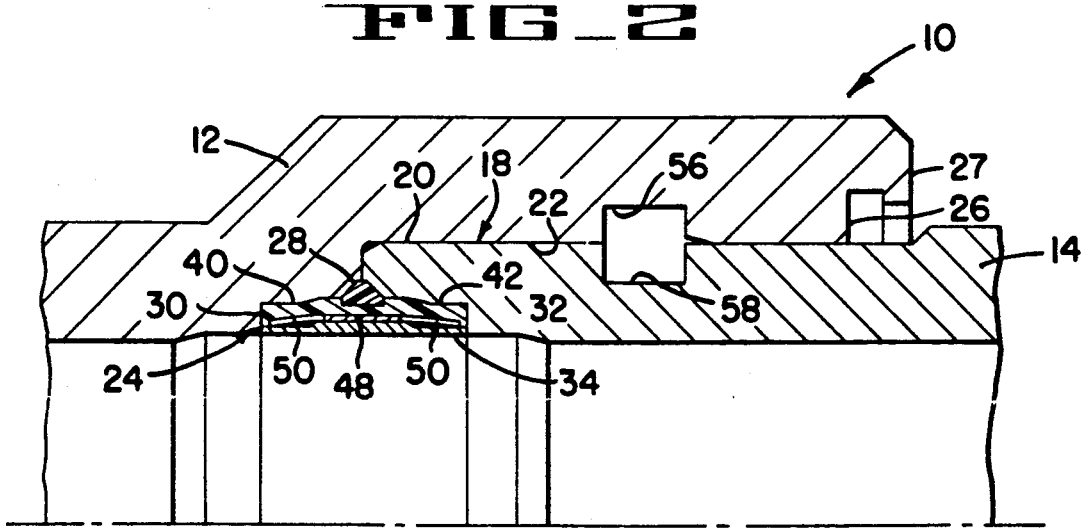
FIG_2

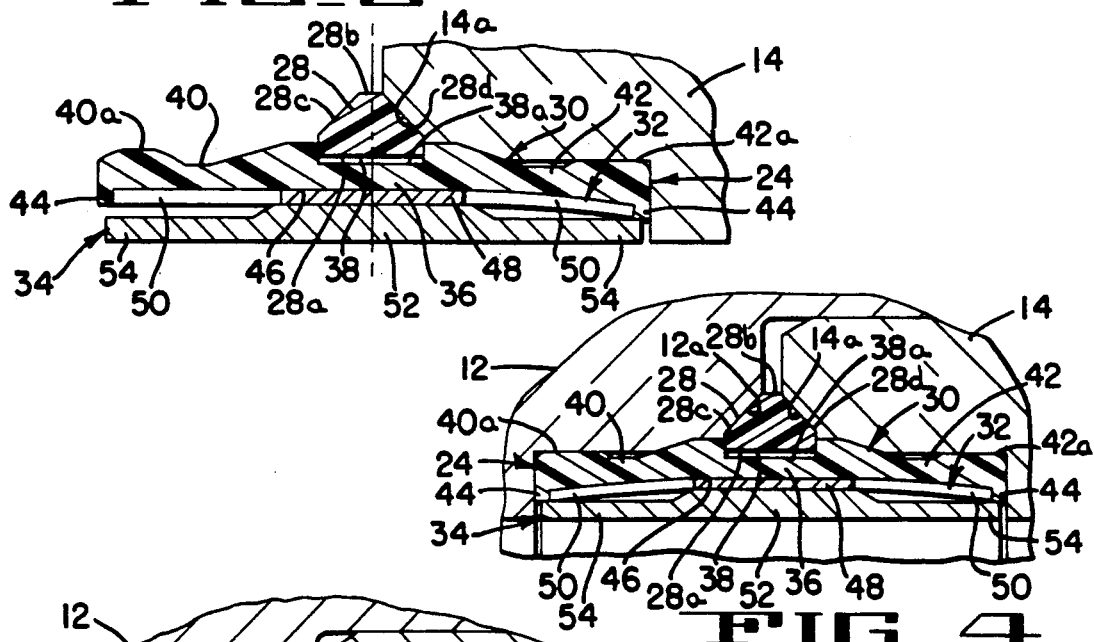
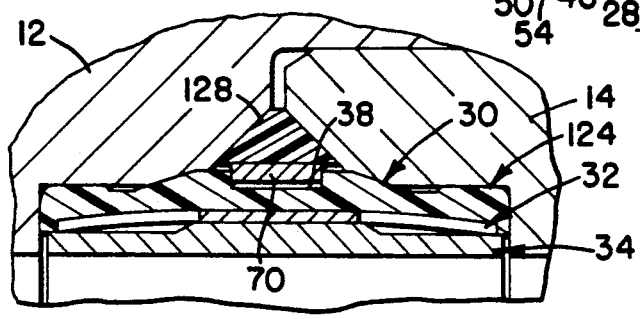
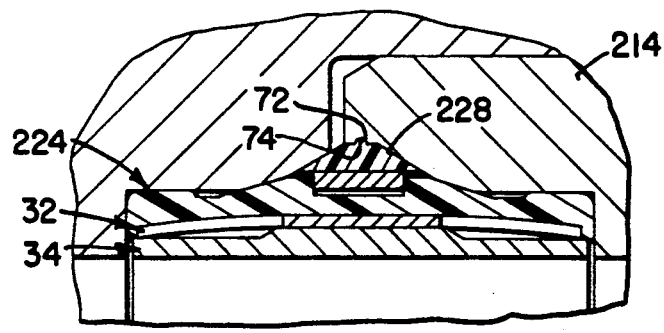
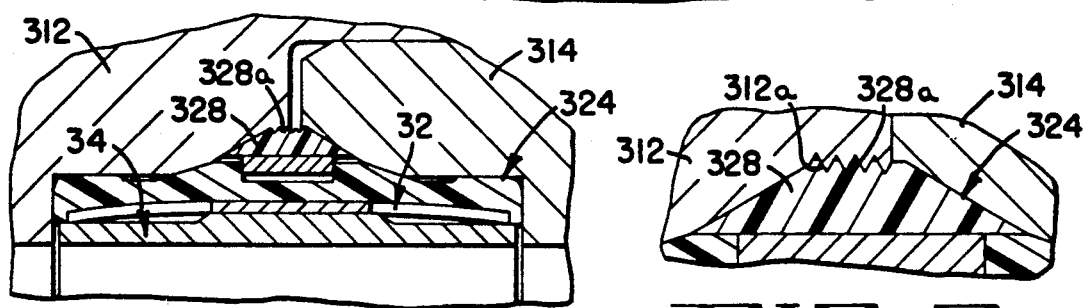

PIPE SWIVEL JOINT WITH IMPROVED BORE SEAL

BACKGROUND OF THE INVENTION

This invention relates to pipe swivel joints, and more particularly to such joints with bore seals having anti-extrusion components.

Many present pipe swivel joints are difficult and expensive to maintain in functional condition because of their relatively complex design and their large number of components including, for example, loose bearings, threaded locking mechanisms, and seals with non-integral anti-extrusion devices. The problems presented by these disadvantages, especially when amplified by the harsh environments encountered in the petroleum industry, have discouraged routine field maintenance of those swivel joints, thereby resulting in increased operating costs and greater potential for accidents or other safety-endangering problems.

SUMMARY OF THE INVENTION

The present invention provides a pipe swivel joint that has relatively few components, is quickly and easily assembled and disassembled even in the field, and that continues to function satisfactorily over longer time periods, thereby requiring servicing at less frequent intervals, than joints of more complex design. A swivel joint in accordance with the present invention includes male and female hubs, a strip-type load/bearing mechanism for interlocking the hubs in a rotatable manner while providing a thrust bearing therebetween, and an improved bore seal assembly with an anti-extrusion ring that axially energizes the hubs toward their operational position as the joint is being assembled. During the assembly process the anti-extrusion ring is subjected to compressive loading between the hubs and allows them to be axially overstroked past their normal operational position to facilitate installation of the load/bearing mechanism. Following installation of that mechanism the hubs are permitted to return axially to their normal operating position in which the joint can be rotated easily either clockwise or counter-clockwise.

BRIEF DESCRIPTION OF THE DRAWINGS

FIG. 1 is a longitudinal central section through a pipe swivel joint according to the present invention, showing the male and female hubs, the load/bearing locking mechanism and the bore seal in their normal operational positions.

FIG. 2 is a view like FIG. 1, but showing the swivel joint hubs in an overstroked position in preparation for inserting the locking mechanism.

FIG. 3 is a central axial section, on an enlarged scale, of the bore seal of FIGS. 1 and 2, with the right half of the seal in operational position in the male hub of the swivel joint.

FIG. 4 is a fragmentary view, on an enlarged scale, of the bore seal and hubs of the swivel joint of FIG. 1.

FIGS. 5–7 are views like FIG. 4, showing additional embodiments of bore seals in accordance with the present invention.

FIG. 8 is an enlarged fragmentary view of the anti-extrusion ring and adjacent components of the swivel joint of FIG. 7.

DESCRIPTION OF THE PREFERRED EMBODIMENT

As seen in FIGS. 1–4, the preferred embodiment of the present invention comprises a pipe swivel joint 10 that includes a female hub 12, a male hub 14, a strip-type load/bearing mechanism 16 that locks the hubs 12, 14 together yet facilitates their relative rotation, a radial bearing 18 between the outer surface 20 of the inner hub and the inner surface 22 of the outer hub, and a bore seal assembly 24 that provides a fluid pressure-tight seal between the hubs 12, 14. An inner annular groove 26 near the front end 27 of the female hub 12 provides a chamber for an annular dust seal (not shown) to isolate the radial bearing 22 and other internals from the external atmosphere, protecting them from dust, moisture and other contaminants.

The strip-type load/bearing mechanism 16 may have a generally square cross section as illustrated, and may comprise a plurality of arcuate load elements interlocked in end-to-end manner as fully described in Witt et al. U.S. Pat. No. 4,867,483 (elements 17), or may comprise arcuate load elements secured together in the manner described in Ungchusri et al. U.S. Pat. No. 4,927,192, the content of both patents being incorporated herein by reference.

The radial bearing 18 may comprise a dry film coating of polytetrafluoroethylene (PTFE), or a sprayed-on aluminum bronze coating, on either the outer surface 20 of the male hub 14 or the inner surface 22 of the female hub 12, or on both surfaces. Also, a non-integral, press fitted journal bearing (not shown) may be used to support the radial load between the hubs 12, 14.

The bore seal assembly 24 is similar in several respects to that described in Ungchusri et al. U.S. Pat. No. 4,930,791, the content of which is incorporated herein by reference, but has an anti-extrusion ring 28 of improved design and function. The seal assembly 24 comprises a sleeve-like plastic seal element 30, a sleeve-like finger spring 32, a wear sleeve 34, and the anti-extrusion ring 28, these elements shown properly assembled in the drawings.

The seal element 30 comprises a central portion 36 with an outer annular groove 38 within which resides the anti-extrusion ring 28, two annular sealing lips 40, 42 extending axially from the central portion 36, the lips having annular radiused surfaces 40a, 42a for establishing a fluid pressure seal with the hubs 12, 14 respectively, and an inwardly oriented radial flange 44 at each end for retaining the finger spring 32 in proper position in the seal element bore 46.

The finger spring 32 has a central annular continuous portion 48 and a plurality of circumferentially spaced spring fingers 50 extending axially in opposite directions from the portion 48. The spring fingers 50 support the seal element lips 40, 42 in fluid pressure tight contact with the adjacent bore surfaces of the hubs 12, 14, and also serve to provide the seal element with a memory property that is not affected by high pressure and/or temperature cycling.

The wear sleeve 34 has a central portion 52 that fits against the finger spring central portion 48, and end portions 54 of lesser outside diameter that reside radially inward of the spring fingers 50.

As illustrated best in the right half of FIG. 3, the annular space between the wear sleeve end portions 54 and the spring fingers 50 enable the fingers to flex radially inward during installation of the seal assembly 24 into functional position between the hubs 12, 14 (FIG. 4).

As seen best in FIGS. 3 and 4, the anti-extrusion ring 28 has cylindrical inner and outer surfaces 28a, 28b, and sloping side surfaces 28c, 28d that extend between the inner and outer surfaces at an angle in the range of about 30 to 45 degrees with respect to inner surface 28a. In its functional sealing position shown in FIGS. 1 and 4, the ring's side surfaces 28c, 28d are in contact with adjacent annular surfaces 12a, 14a of the female and male hubs 12, 14, and the inner cylindrical surface 28a is radially spaced from the bottom surface 38a of the annular groove 38 in the seal element 30.

The procedure for assembling the swivel joint 10 is relatively simple and straightforward, and involves the following steps. The bore seal assembly 24 is pressed into either the male hub 14 (FIG. 3) or the female hub 12, and the two hubs are then axially aligned and telescoped, thereby pressing the bore seal assembly fully into the other hub (FIG. 4) wherein both the hub surfaces 12a, 14a are in contact with the adjacent anti-extrusion ring surfaces 28c, 28d, respectively, and the ring is compressed radially inward in the groove 38. From this point the hubs are telescoped further to overstroke them until the inner annular groove 56 in the female hub 14 and the outer annular groove 58 in the male hub 12 are aligned as shown in FIG. 2, thereby facilitating installation of the load/bearing mechanism 16 into the grooves through a port (not shown) in the female hub 14. As the hubs undergo this further telescoping the anti-extrusion ring 28 is placed in compressive loading which energizes the hubs, i.e. tries to force them axially apart to their FIG. 4 position. Following installation of the load/bearing mechanism 16, the hubs 12, 14 are allowed to return to their functional operating position, as shown in FIGS. 1 and 4, in response to the energizing force of the anti-extrusion ring 28, and in this operating position the swivel joint 10 can be easily rotated both clockwise and counterclockwise.

The anti-extrusion ring 28 is formed from a material of sufficient resiliency to undergo the above described compression and yet return to its original functional size and condition. The preferred material for the ring 28 is polyetheretherketone (PEEK).

DESCRIPTION OF ADDITIONAL EMBODIMENTS

FIG. 5 illustrates a modified version 124 of the bore seal assembly 24. In the assembly 124 the anti-extrusion ring 128 has a truncated triangular shape in cross-section, and surrounds a metallic or other relatively rigid annular support element 70 that resides in the groove 38 of the seal element 30.

FIG. 6 shows a bore seal assembly 224 similar to that of FIG. 5, but wherein the anti-extrusion ring 228 has an annular ridge 72 that cooperates with an annular groove 74 in the male hub 214 to hold the ring in proper functional position as illustrated.

FIGS. 7 and 8 illustrate yet another embodiment of bore seal assembly 324 that resembles the assemblies of FIGS. 5 and 6, but wherein the anti-extrusion ring 328 has a serrated annular surface 328a that cooperates with a complementary surface 312a on the female hub 312 to secure the ring 328 in its proper operational position as shown.

Although the best mode contemplated for carrying out the present invention has been herein shown and described, it will be apparent that modification and variation may be made without departing from what is regarded to be the subject matter of the invention.

What is claimed is:

1. A pipe swivel joint capable of quick and easy servicing in the field, said joint comprising an assembly of
   a) a male pipe swivel joint hub;
   b) a female pipe swivel joint hub;
   c) means interlocking said hubs in a rotatable manner while providing a thrust bearing therebetween;
   d) radial bearing means between said hubs; and
   e) a bore seal assembly for providing a dynamic fluid pressure seal between said hubs, said bore seal assembly comprising a sleeve-like seal element with an outer annular groove and an anti-extrusion ring residing in said groove to prevent extrusion of said seal element and radially energize said joint hubs toward their operational positions.

2. A swivel joint according to claim 1 wherein the anti-extrusion ring is compressed by overstroking the joint hubs during their assembly procedure, said compression resulting in energization of said hubs in a direction urging their axial separation.

3. A swivel joint according to claim 2 wherein said overstroking facilitates installation of said interlocking means between said hubs.

4. A swivel joint according to claim 2 wherein said anti-extrusion ring has a generally cylindrical inner surface and at least one angular side surface oriented at an oblique angle with respect to said inner surface.

5. A swivel joint according to claim 4 wherein said angle is in the range of about 30 to 45 degrees with respect to said inner cylindrical surface.

6. A swivel joint according to claim 5 including a second angular side surface on the anti-extrusion ring.

7. A swivel joint according to claim 6 wherein the second angular side surface resides at an angle of between about 30 to 45 degrees with respect to said inner surface.

8. A swivel joint according to claim 7 wherein said anti-extrusion ring has a generally cylindrical outer surface intersecting said angular side surfaces.

9. A swivel joint according to claim 2 wherein the anti-extrusion ring and one of the hubs have ring-holding means that cooperate to hold said ring in said hub.

10. A swivel joint according to claim 9 wherein the ring-holding means comprises an annular ridge on an outer surface of said ring and an annular groove in an adjacent surface of said hub.

11. A swivel joint according to claim 9 wherein the ring-holding means comprises a serrated annular surface on the ring and a complementary serrated annular surface on a hub.

12. A swivel joint according to claim 1 wherein the sleeve-like seal element has an outer annular groove, and the bore seal assembly includes an annular support element that resides in said groove and that is surrounded by the anti-extrusion ring.

13. A swivel joint according to claim 1 wherein the anti-extrusion ring is compressed axially and radially by the hubs as the joint is being assembled, and then decompressed as the hubs move into their functional positions.

14. A swivel joint according to claim 1 wherein the bore seal assembly further includes a sleeve-like finger spring that biases the sleeve-like seal element towards adjacent hub surfaces.

15. A swivel joint according to claim 14 wherein the bore seal assembly further includes a wear sleeve within the sleeve-like finger spring.

16. A swivel joint according to claim 1 wherein the sleeve-like seal element is constructed of a plastic material, and the anti-extrusion ring is constructed of polyetheretherketone.

17. A swivel joint according to claim 1 wherein the radial bearing means comprises a dry film coating of polytetrafluoroethylene on at least one of the hubs.

18. A swivel joint according to claim 1 wherein the radial bearing means comprises an aluminum-bronze coating on at least one of the hubs.

* * * * *